P. G. HOLLSTEIN.
MELTING KETTLE.
APPLICATION FILED JAN. 16, 1915.

1,154,772.

Patented Sept. 28, 1915.

WITNESSES:

INVENTOR
Paul G. Hollstein
BY
ATTORNEYS

UNITED STATES PATENT OFFICE.

PAUL G. HOLLSTEIN, OF CARLSTADT, NEW JERSEY, ASSIGNOR TO J. M. LEHMANN COMPANY, OF NEW YORK, N. Y.

MELTING-KETTLE.

1,154,772.        Specification of Letters Patent.        Patented Sept. 28, 1915.

Application filed January 16, 1915.    Serial No. 2,698.

*To all whom it may concern:*

Be it known that I, PAUL G. HOLLSTEIN, a citizen of Germany, residing at Carlstadt, county of Bergen, and State of New Jersey, have invented new and useful Improvements in Melting-Kettles, of which the following is a specification.

This invention relates to a novel kettle more especially designed for melting chocolate and similar matter and has for its particular purpose, a thorough agitation of the molten mass so as to effectively prevent the latter from being of a different constitution at different levels. With this object in view, I have provided the kettle not only with stirring and agitating means, but also with a device for continuously effecting an upward movement of the mass, which device is likewise continuously rotated within the kettle so as to attack different portions of the mass during its travel.

The invention further includes various other novel features more fully brought out in the annexed specification and claims.

Figure 1:
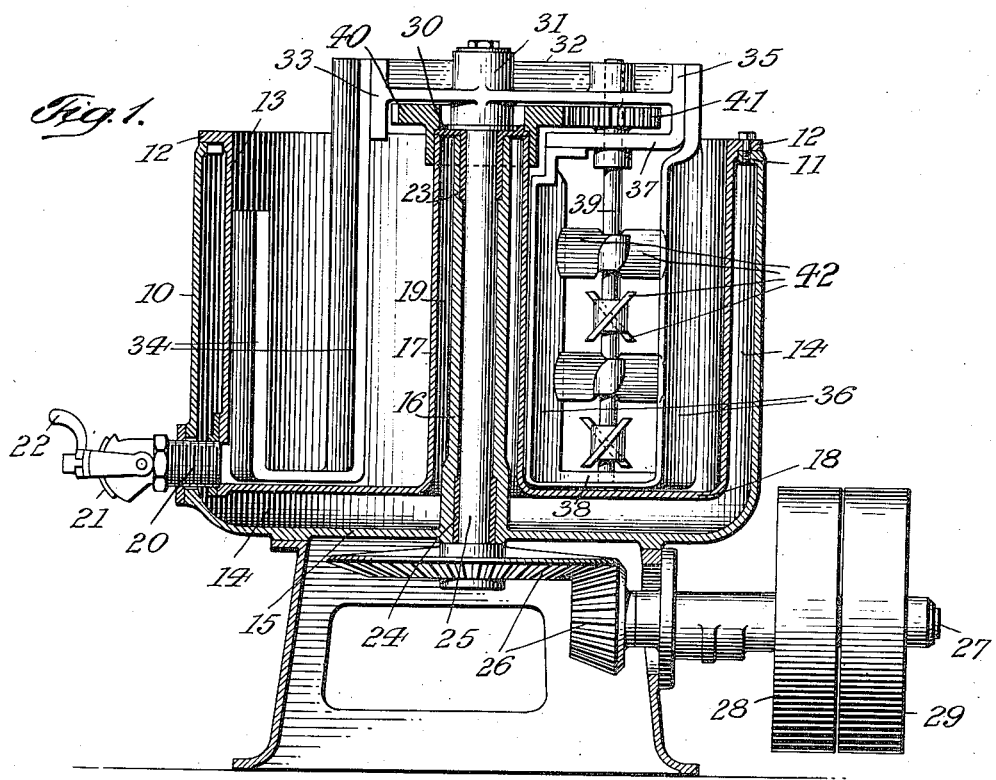
Figure 2:
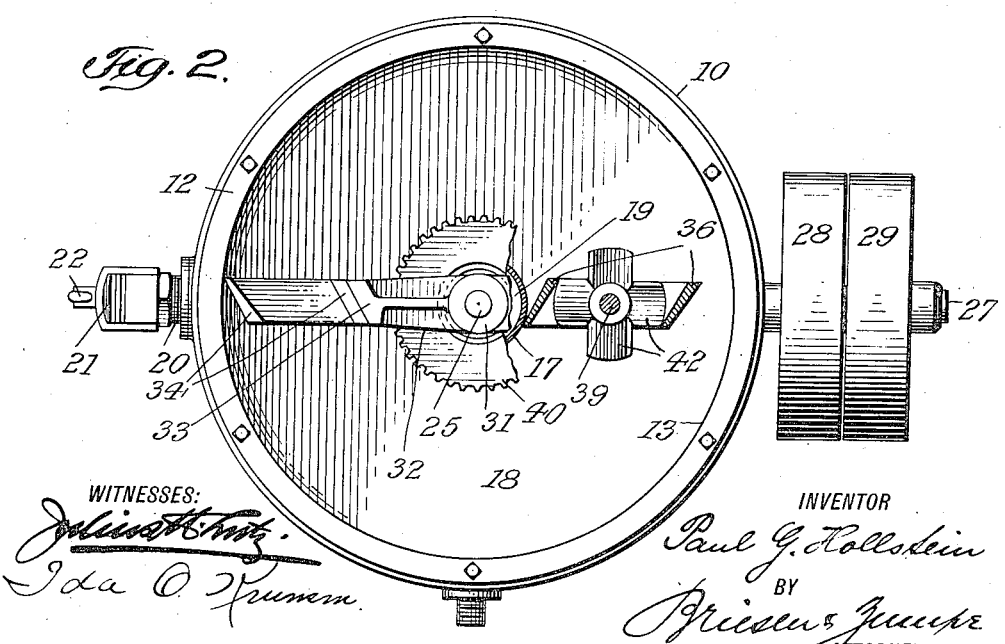

In the accompanying drawing, Figure 1 is a vertical axial section through a melting kettle embodying my invention, and Fig. 2, a plan view, partly in section, thereof.

The numeral 10 indicates a cylindrical casing to the upper inwardly extending flange 11 of which is secured the outwardly extending flange 12 of the melting vessel 13 the latter being somewhat smaller than casing 10 so as to form a heating jacket 14 therebetween. From the bottom 15 of casing 10, there extends upwardly a central tube 16 that is encompassed by a similar tube 17 extending upwardly from the bottom 18 of vessel 13, a steam space 19 being formed between tubes 16 and 17 that communicates with jacket 14. Vessel 13 is provided near its bottom with an outlet pipe 20 that extends through jacket 14 and casing 10 and is controlled by a gate 21 operable by a handle 22.

Into the upper and lower ends of tube 16 are tightly fitted bushings 23, 24 respectively that constitute the bearings for an upright shaft 25. The latter receives rotary movement, through bevel gear 26, from a power shaft 27 carrying fast and loose pulleys 28, 29. The upper bushing 23 is shown to be provided with a flange 30 that forms the closure for jacket portion 19. To the upper end of shaft 25 is firmly attached the hub 31 of a traverse 32 having two arms of different length. To the shorter arm 33 of this traverse is secured the inner shank of a substantially U-shaped stirrer 34, both shanks of said stirrer being set obliquely to traverse 32. To the longer arm 35 of the latter is firmly attached the outer shank of a likewise substantially U-shaped stirrer 36 the inner shank of which is secured to an extension 37 projecting inwardly from the outer end of arm 35. As clearly illustrated in Figs. 1 and 2 the shanks of stirrer 36 are inclined oppositely to those of stirrer 34 and are located more closely to shaft 25 than the shanks of said last named stirrer, so that all parts of the mass contained within vessel 13 are effectively attacked to cause a thorough agitation of the mass. Through arm 35, extension 37 and the cross web 38 of stirrer 36 extends an upright shaft 39 carrying a plurality of double vanes or scoops 42 that are so set relatively to the direction of rotation of spindle 39 as to impart an upward movement to the mass encountered thereby. For imparting the necessary rotary movement to spindle 39, tube 17 carries at its upper end a stationary gear wheel 40 into which meshes a gear wheel 41 fast on spindle 39.

It will be seen that during the rotation of spindle 25, stirrers 34, 36 will thoroughly agitate the mass to be treated, while the pinion 41 rotating with the stirrers, around the stationary gear wheel 40, will cause scoops 42 to rotate within stirrer 36, thereby imparting the desired upward movement to that portion of the mass that is temporarily in contact therewith.

I claim:—

1. A device of the character described, comprising a jacketed vessel, a rotatable shaft extending axially therethrough, a traverse on the shaft, a U-shaped stirrer suspended from the traverse and rotatable around the shaft-axis, a spindle stepped into the bottom of the stirrer and into the traverse and rotatable around the shaft-axis and likewise around its own axis, and inclined vanes carried by the spindle and accommodated within the clearance of the U-shaped stirrer.

2. A device of the character described, comprising a cylindrical casing having an inner tube, a vessel fitted within the casing and having an outer tube that encompasses the inner tube, a heating jacket formed between casing and vessel, said jacket extending likewise between the tubes, a rotatable shaft extending centrally through the casing-tube, a traverse on the shaft, a U-shaped stirrer suspended from the traverse, a spindle stepped into the traverse and into the bottom of the stirrer, inclined vanes carried by the spindle, a gear wheel fast on the outer tube, and a gear wheel on the spindle that meshes into the first named gear wheel, whereby the rotation of the shaft will effect a rotation of the stirrer and of the spindle around the axis of the shaft, and likewise a rotation of the spindle around its own axis.

PAUL G. HOLLSTEIN.

Witnesses:
ARTHUR E. ZUMPE,
MADELIN L. HIRSCH.